United States Patent
Hsu et al.

(10) Patent No.: US 11,719,862 B2
(45) Date of Patent: Aug. 8, 2023

(54) OPTICAL LENS DEVICE FOR A HEAD-MOUNTED DISPLAY, AND METHOD AND MOLD FOR PRODUCING THE SAME

(71) Applicant: Optivision Technology Inc., Hsinchu (TW)

(72) Inventors: Li-Jen Hsu, Yilan County (TW); Nan-Hung Kuo, Yilan (TW); Tsung-Hsien Wu, Hsinchu (TW); Young-Cheng Chou, New Taipei (TW)

(73) Assignee: OPTIVISION TECHNOLOGY INC., Hsinchu (TW)

( * ) Notice: Subject to any disclaimer, the term of this patent is extended or adjusted under 35 U.S.C. 154(b) by 337 days.

(21) Appl. No.: 17/135,137

(22) Filed: Dec. 28, 2020

(65) Prior Publication Data

US 2022/0206192 A1    Jun. 30, 2022

(51) Int. Cl.
*G02B 3/08* (2006.01)
*G02B 1/04* (2006.01)
(Continued)

(52) U.S. Cl.
CPC .......... *G02B 3/08* (2013.01); *B29D 11/00269* (2013.01); *G02B 1/041* (2013.01); *G02B 1/14* (2015.01); *B29K 2033/12* (2013.01)

(58) Field of Classification Search
CPC . G02B 3/08; G02B 1/041; G02B 1/14; G02B 3/0031; B29D 11/00269; B29D 11/0048; B29D 11/0073; B29K 2033/12
See application file for complete search history.

(56) References Cited

U.S. PATENT DOCUMENTS

| 2005/0195489 A1* | 9/2005 | Watabe | G02B 3/08 |
| | | | 359/642 |
| 2011/0096252 A1* | 4/2011 | Im | G02B 3/14 |
| | | | 349/200 |

(Continued)

FOREIGN PATENT DOCUMENTS

| CN | 102809770 A | 12/2012 |
| CN | 108132528 A | 6/2018 |

(Continued)

OTHER PUBLICATIONS

Search Report appended to an Office Action, which was issued to Taiwanese counterpart application No. 109145415 by the TIPO dated Apr. 28, 2021, with an English translation thereof (2 pages).

*Primary Examiner* — Darryl J Collins
*Assistant Examiner* — Matthew Y Lee
(74) *Attorney, Agent, or Firm* — Muncy, Geissler, Olds & Lowe, P.C.

(57) ABSTRACT

An optical lens device for a head-mounted display includes a transparent support substrate and a Fresnel lens disposed thereon. The Fresnel lens includes a central lens element and a plurality of prismatic elements arranged relative to the central lens element in a proximal-to-distal manner. Each of the prismatic elements has a base facing toward the support substrate, and a draft facet and a sloped facet extending from the base away from the support substrate to intersect with each other to form an apex. Each of the prismatic elements has a height measured from the base to the apex and not greater than 75 μm. The base has a width not greater than 250 μm. A method and a mold for producing the optical lens device are also disclosed.

11 Claims, 7 Drawing Sheets

(51) Int. Cl.
  *B29D 11/00* (2006.01)
  *G02B 1/14* (2015.01)
  *B29K 33/00* (2006.01)

(56) References Cited

U.S. PATENT DOCUMENTS

| 2015/0124315 | A1* | 5/2015 | Sasahara | B29D 11/00288 |
| | | | | 359/457 |
| 2019/0154886 | A1* | 5/2019 | Huang | G02B 27/0172 |
| 2020/0049981 | A1* | 2/2020 | Dong | G02B 27/0081 |

FOREIGN PATENT DOCUMENTS

| TW | 201908115 A | 3/2019 |
| TW | 201935040 A | 9/2019 |

* cited by examiner

OPTICAL LENS DEVICE FOR A HEAD-MOUNTED DISPLAY, AND METHOD AND MOLD FOR PRODUCING THE SAME

FIELD

The disclosure relates to an optical lens device and a method and a mold for producing the same, and more particularly to an optical lens device for a head-mounted display and a method and a mold for producing the same.

BACKGROUND

Conventional optical lens devices for light convergence or divergence employ lens that have a thickness in millimeter scale. To reduce the overall thickness of optical lens devices, thinner Fresnel lenses in submillimeter scale are used to replace the lens in millimeter scale. However, optical lens devices having such Fresnel lenses, when applied to head-mounted displays (HMD) or near-eye displays (NEDs), might cause undesired light interference patterns (e.g. visible rings) perceivable to users and hence negatively affect the display quality of HMD.

U.S. Ser. No. 10/359,545 B2 discloses a curved Fresnel lens for a head-mountable apparatus. Such curved Fresnel lens has draft facets that are angled based on the index of refraction of the curved Fresnel lens to be congruent with light refraction paths, so as to reduce undesired light interference patterns perceivable to users. However, the degree of curvature regarding the curved Fresnel lens is strictly limited, and the curved Fresnel lens, when used in a head-mountable apparatus, cannot prevent images from easy deformation.

SUMMARY

Therefore, an object of the disclosure is to provide an optical lens device for a head-mounted display and a method and a mold for producing the same, which can alleviate at least one of the drawbacks of the prior art.

The optical lens device includes a transparent support substrate and a Fresnel lens disposed on the support substrate. The Fresnel lens includes a central lens element and a plurality of prismatic elements that are arranged relative to the central lens element in a proximal-to-distal manner. Each of the prismatic elements has a base that faces toward the support substrate, and a draft facet and a sloped facet that extend from the base away from the support substrate to intersect with each other to form an apex. Each of the prismatic elements has a height that is measured from the base to the apex and that is not greater than 75 µm. The base has a width that is not greater than 250 µm.

The production method includes the following steps. A transparent support substrate is provided. A mold is provided. The mold includes a central lens-forming feature and a plurality of prism-forming grooves that are arranged relative to the central lens-forming feature in a proximal-to-distal manner. Each of the prism-forming grooves has an opening, a nadir that is opposite to the opening, and a draft facet and a sloped facet that extend from the opening to intersect with each other at the nadir. A depth measured from the opening to the nadir is not greater than 75 µm. A distance between the draft facets of two adjacent ones of the prism-forming grooves is not greater than 250 µm. An ultraviolet (UV)-curable resin is disposed on at least one of the support substrate and the mold. The UV-curable resin is subjected to a molding process with the mold. The UV-curable resin is subjected to UV irradiation so as to form a Fresnel lens on the support substrate. The Fresnel lens includes a central lens element that corresponds in position to the central lens-forming feature of the mold, and a plurality of prismatic elements that correspond in position to the prism-forming grooves of the mold, respectively. The Fresnel lens is released from the mold.

The mold for producing the optical lens device is as described above.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
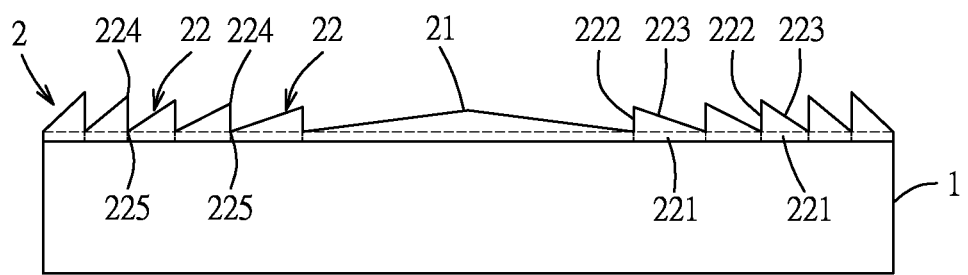
FIG. 1 is a schematic sectional view illustrating a first embodiment of an optical lens device for a head-mounted display according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a first embodiment of an optical lens device for a head-mounted display according to the present disclosure includes a transparent support substrate 1 and a Fresnel lens 2 disposed on the support substrate 1. The Fresnel lens 2 includes a central lens element 21 and a plurality of prismatic elements 22 that are arranged relative to the central lens element 21 in a proximal-to-distal manner. In this embodiment, the prismatic elements 22 are arranged concentrically and are annular, and surround the central lens element 21.

Each of the prismatic elements 22 has a base 221, a draft facet 222, and a sloped facet 223. The horizontal dashed line parallel to the support substrate 1 and the vertical dashed lines perpendicular to the support substrate 1 in FIG. 1 cooperate to indicate the bases 221 of the prismatic elements 22. The base 221 faces toward the support substrate 1, and the draft facet 222 and the sloped facet 223 extend from the base 221 away from the support substrate 1 to intersect with each other to form an apex 224.

Each of the prismatic elements 22 has a height that is measured from the base 221 to the apex 224, and that is not greater than 75 µm. The base 221 has a width that is not greater than 250 µm. The height of each of the prismatic elements 22 may range from 2 µm to 25 µm, and the width of the base 221 may range from 30 µm to 200 µm. In this embodiment, the height of the prismatic elements 22 may be about 15 µm, and the width of the base 221 may be about 180 µm.

The Fresnel lens 2 may be made from a methacrylate-based ultraviolet (UV)-curable resin.

The support substrate 1 may be made from a material selected from the group consisting of polyethylene terephthalate (PET), polycarbonate (PC), poly(methyl methacrylate) (PMMA), and combinations thereof. In this embodiment, the support substrate 1 is made from PET.

The support substrate 1 may have a thickness that is not greater than 600 µm. The thickness of the support substrate 1 may range from 50 µm to 600 µm. Moreover, the support substrate 1 may have a radius of curvature that ranges from 0.5 cm to 15 cm. In this embodiment, the thickness of the support substrate 1 may be about 188 µm, and the support substrate 1 has a radius of curvature that may be about 0.5 cm (namely, the support substrate 1 may be slightly curved).

The apex 224 of each of the prismatic elements 22 may be a fillet, and each of the prismatic elements 22 may have a radius of curvature at the apex 224 that is not greater than 2 µm. In this embodiment, the radius of curvature at the apex 224 may be about 2 µm.

In this embodiment, the draft facet 222 of each of the prismatic elements 22 intersects with the sloped facet 223 of an adjacent one of the prismatic elements 22 to form a groove nadir 225. The groove nadir 225 may be a fillet, and a radius of curvature at the groove nadir 225 may be not greater than 2 µm. In this embodiment, the radius of curvature at the groove nadir 225 may be about 2 µm.

Figure 4:
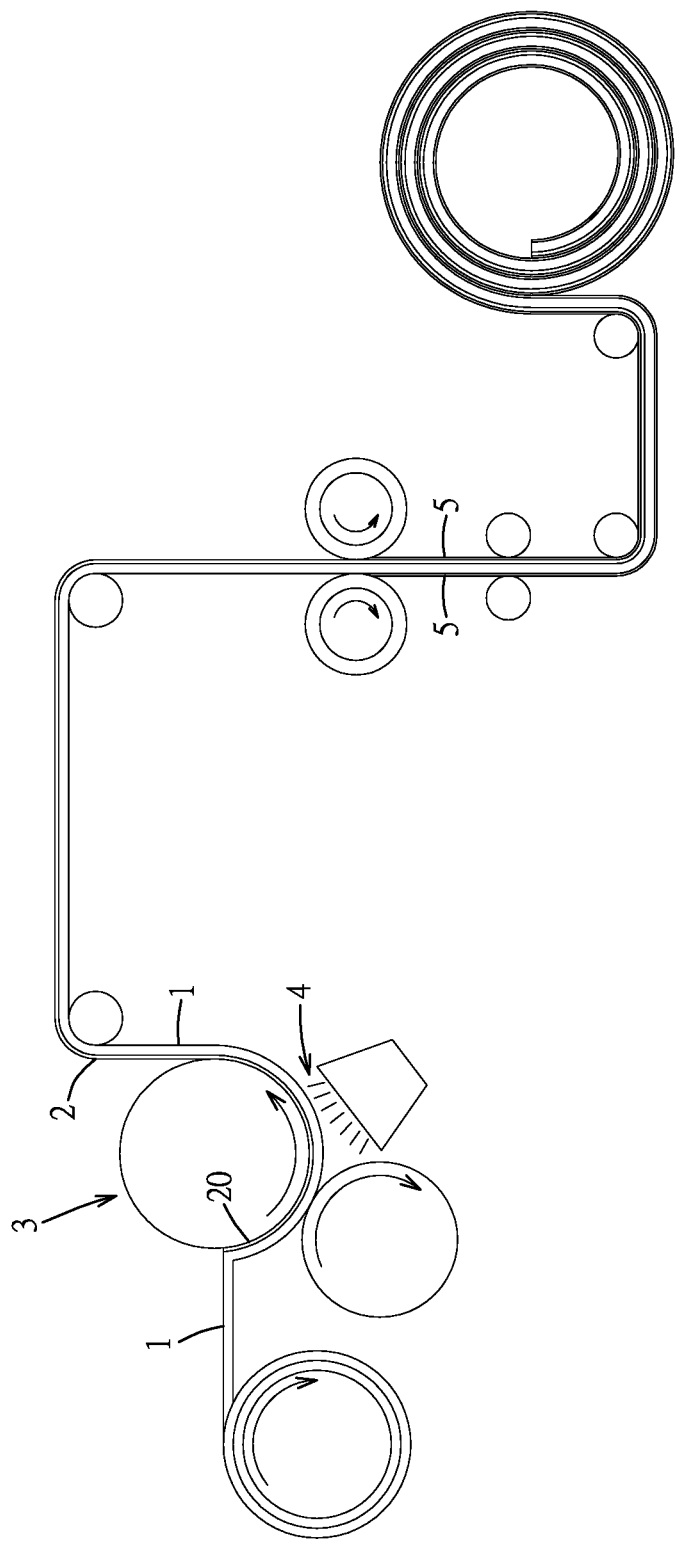
FIG. 4 is a schematic view illustrating equipments used to conduct the first embodiment of the production method.

The optical lens device may further include a protective film 5 (not shown in FIG. 1) that is disposed on at least one of the Fresnel lens 2 and the transport substrate 1. As shown in FIG. 4, in this embodiment, the protective film 5 is disposed on both the Fresnel lens 2 and the transport substrate 1.

The protective film 5 may be made from a material selected from the group consisting of a UV-curable hard coating material (having a pencil hardness of at least 2H), polyethylene, polypropylene, and combinations thereof.

The central lens element 21 may be one of a protruding lens element (e.g. a convex lens element, a conical lens element, etc.), a recessed lens element (e.g. a concave lens element, a conically recessed lens element, etc.), and a flat lens element. In this embodiment, the central lens element 21 is a protruding lens element, to be exact, a conical lens element.

Figure 2:
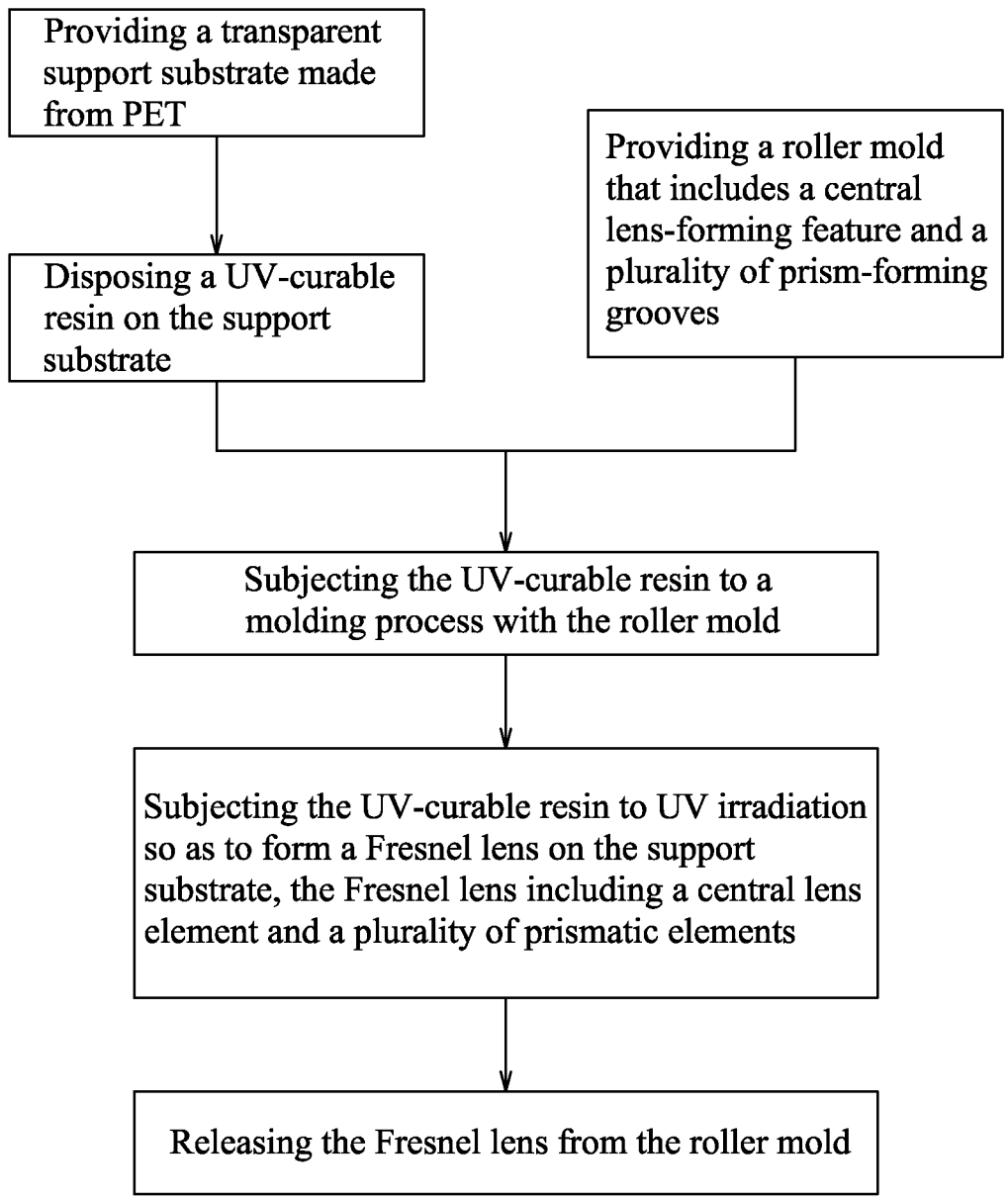
FIG. 2 is a flow chart illustrating a first embodiment of a method for producing an optical lens device for a head-mounted display according to the present disclosure.
Figure 5:
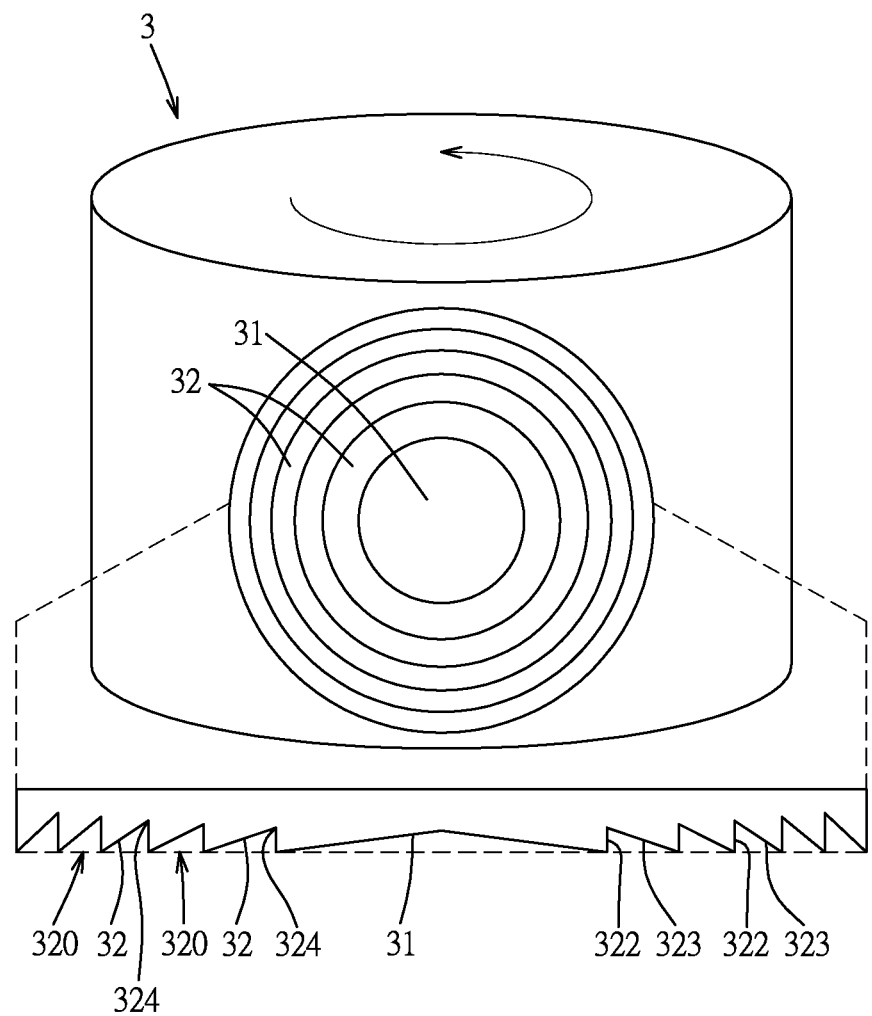
FIG. 5 is a schematic view illustrating a roller mold used in the first embodiment of the production method.

Referring to FIGS. 2, 4 and 5, a first embodiment of a method for producing the first embodiment of the optical lens device according to the present disclosure is a roll-to-roll processing method, and includes the following steps.

The transparent support substrate 1 is provided, and a mold 3 is provided. In this embodiment, the mold 3 is a roller mold. The mold 3 includes a central lens-forming feature 31 and a plurality of prism-forming grooves 32 that are arranged relative to the central lens-forming feature 31 in a proximal-to-distal manner. In this embodiment, the prism-forming grooves 32 are arranged concentrically and are annular, and surround the central lens-forming feature 31.

Each of the prism-forming grooves 32 has an opening 320, a nadir 324 that is opposite to the opening 320, and a draft facet 322 and a sloped facet 323 that extend from the opening 320 to intersect with each other at the nadir 324. The horizontal dashed line in FIG. 5 indicates the openings 320 of the prism-forming grooves 32.

A depth measured from the opening 320 to the nadir 324 is not greater than 75 µm. A distance between the draft facets 322 of two adjacent ones of the prism-forming grooves 32 is not greater than 250 µm. The distance between the draft facets 322 of the two adjacent ones of the prism-forming grooves 32 may range from 30 to 200 µm, and the depth of each of the prisms-forming grooves 32 may range from 2 to 25 µm. In this embodiment, the distance between the draft facets 322 of the two adjacent ones of the prism-forming grooves 32 may be about 180 µm, and the depth of the prisms-forming grooves 32 may be about 15 µm.

In this embodiment, the nadir 324 of each of the prism-forming grooves 32 has an acute angle. Furthermore, in this embodiment, the draft facet 322 of each of the prism-forming grooves 32 and the sloped facet 323 of an adjacent one of the prism-forming grooves 32 together form an acute angle. Please note that in spite of the aforesaid acute angles of the mold 3, the prismatic elements 22 formed from a UV-curable resin may still have the aforesaid fillets since the UV-curable resin may slightly shrink in a controllable manner after curing so as to form the aforesaid fillets.

A UV-curable resin 20 is disposed on at least one of the support substrate 1 and the mold 3, and may be a methacrylate-based UV-curable resin. In this embodiment, the UV-curable resin 20 is disposed on the support substrate 1, and may be purchased from Sil-More Industrial Ltd. (Cat. No. x-8060-1).

The UV-curable resin 20 is subjected to a molding process with the mold 3. Subsequently, the UV-curable resin 20 is subjected to UV irradiation so as to form the Fresnel lens 2 on the support substrate 1. The central lens element 21 of the Fresnel lens 2 corresponds in position to the central lens-forming feature 31 of the mold 3, and the prismatic elements 22 of the Fresnel lens 2 correspond in position to the prism-forming grooves 32 of the mold 3, respectively.

In this embodiment, the UV-curable resin is subjected to irradiation of UV light 4 having a wavelength of 365 nm at 40° C. and at a UV dose of 250 mJ/cm$^2$.

The Fresnel lens 2 is then released from the mold 3.

The production method may further include disposing the protective film 5 on at least one of the Fresnel lens 2 and the support substrate 1 (in this embodiment, on both the Fresnel lens 2 and the transport substrate 1).

The central lens-forming feature 31 may be one of a protruding lens-forming feature (e.g. a convex lens-forming feature, a conical lens-forming feature, a lens-forming feature in a mesa form, etc.) and a recessed lens-forming feature (e.g. a concave lens-forming feature, a conically recessed lens-forming feature, etc.). In this embodiment, the central lens-forming feature 31 is a recessed lens-forming feature, to be exact, a conically recessed lens-forming feature.

Figure 3:
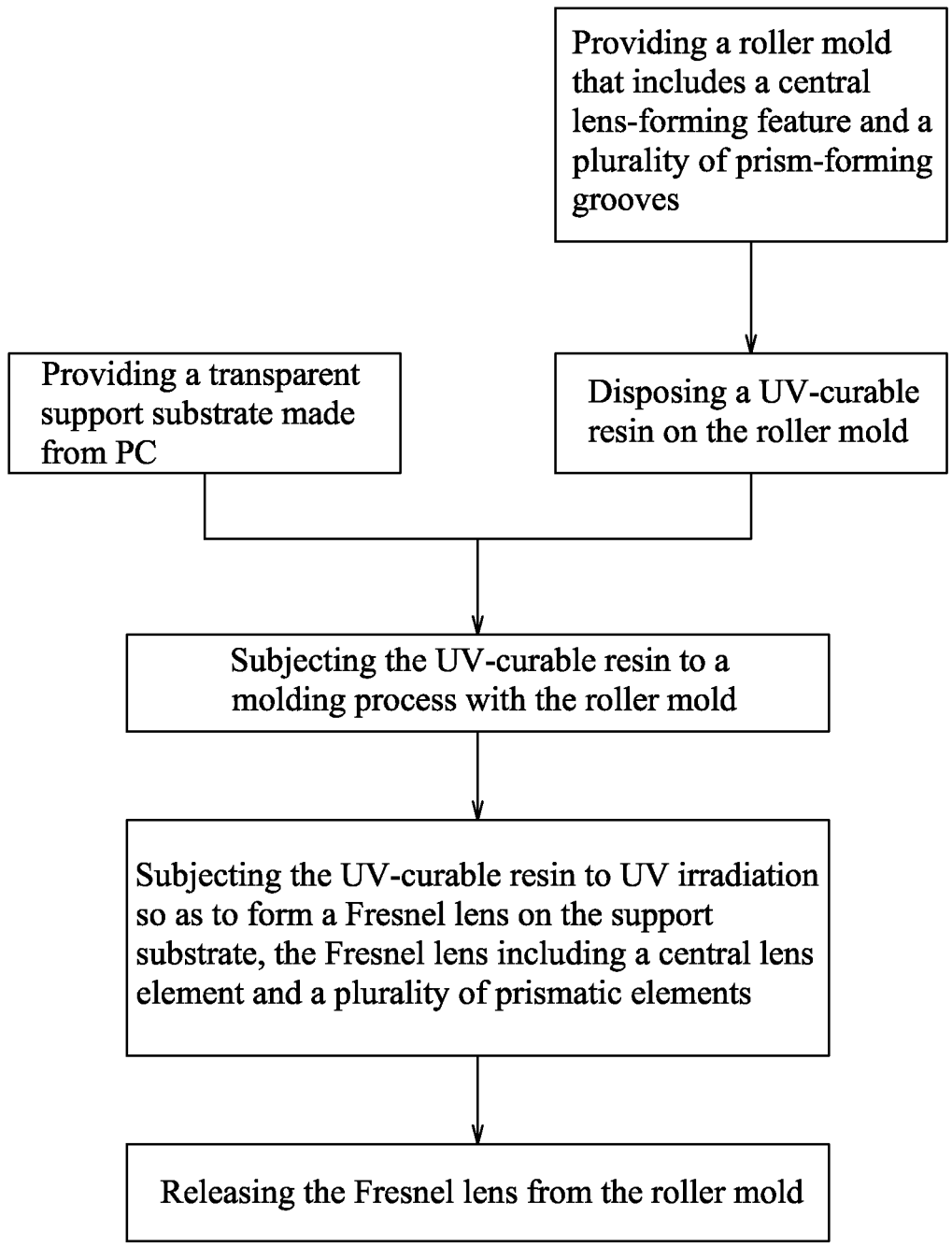
FIG. 3 is a flow chart illustrating a second embodiment of the production method according to the present disclosure.

Referring to FIG. 3, a second embodiment of the optical lens device and the production method according to the present disclosure is generally similar to the first embodiment, except that the support substrate 1 is made from PC, and that the UV-curable resin 20 is disposed on the mold 3 before the molding process.

Figure 6:
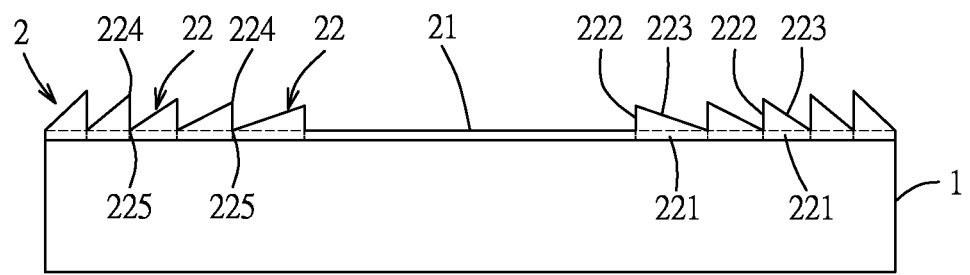
FIG. 6 is a schematic sectional view illustrating a third embodiment of the optical lens device according to the present disclosure.

Referring to FIG. 6, a third embodiment of the optical lens device and the production method according to the present disclosure is generally similar to the first embodiment, except that the central lens element 21 of the Fresnel lens 2 is a flat lens element, and that the central lens-forming feature 31 of the mold 3 is a lens-forming feature in a mesa form (not shown in the drawings).

Figure 7:
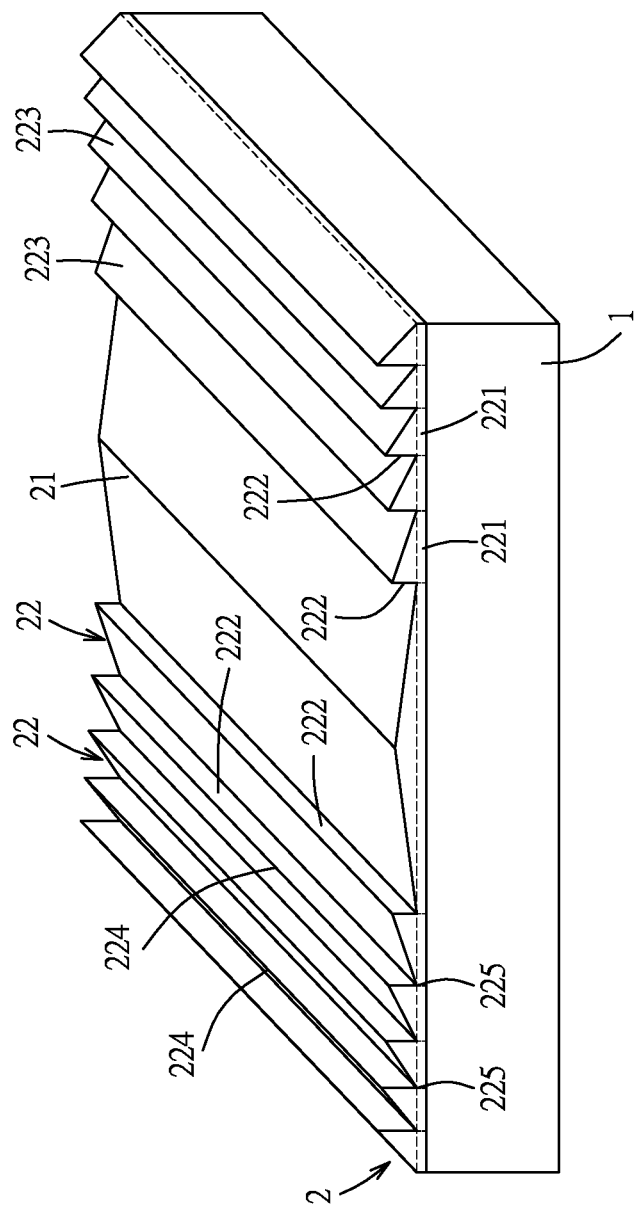
FIG. 7 is a perspective view illustrating a fourth embodiment of the optical lens device according to the present disclosure.

Referring to FIG. 7, a fourth embodiment of the optical lens device and the production method according to the present disclosure is generally similar to the first embodiment, except for the following differences.

The prismatic elements 22 of the Fresnel lens 2 are arranged parallel to one another, and are arranged parallel to the central lens element 21 of the Fresnel lens 2. Thus, the prism-forming grooves 32 of the mold 3 are arranged parallel to one another, and are arranged parallel to the central lens-forming feature 31 of the mold 3 (not shown in the drawings).

The central lens element 21 of the Fresnel lens 2 is prismatic, and the central lens-forming feature 31 of the mold 3 is prismatically recessed (not shown in the drawings).

The advantages of the optical lens device and the production method according to the present disclosure are described below.

First, since the overall thickness of the optical lens device is satisfactory due to the required height of the prismatic elements 22, the optical lens device can be used to produce a head-mounted display that has a volume and weight suitable for long-term use.

Secondly, due to the radius of curvature of the support substrate 1 (which may be about 0.5 cm), the optical lens device is flexible and is not liable to breakage, hence securing the safety of use.

Thirdly, since the width of the bases 221 of the prismatic elements 22 is satisfactorily small, the optical lens device can be prevented from causing undesired light interference patterns. Particularly, regarding the first embodiment of the optical lens device, the applicant has found that: when the width of the bases 221 of the prismatic elements 22 is reduced to about 200 μm or smaller, the prismatic elements 22 are more likely to be not observable by human eyes, thus further improving users' viewing quality upon use of the optical lens device; and nevertheless, the width of the bases 221 of the prismatic elements 22, which is larger than 30 μm, may bring about a more satisfactory performance for the optical lens device.

Fourthly, based on the design of the mold 3, the optical lens device produced using the mold 3 has a structure and a size that are hardly deviated from the expected structure and size resulting from the mold 3. Namely, the transcription rate resulting from the mold 3 is satisfactorily high (the deviation is less than about 10%) Moreover, regarding the first embodiment of the production method, the applicant has found that: when the depth of the prism-forming grooves 32 of the mold 3 is not greater than 75 μm and hence a layer of the UV-curable resin 20 molded by the prism-forming grooves 32 has a satisfactorily small thickness, such thin layer of the UV-curable resin 20 releases less heat during curing by UV irradiation (please note that the curing is an exothermic reaction), such that the support substrate 1, which is made from PET, and on which the thin layer of the UV-curable resin 20 is disposed, is not prone to deformation arising from heat.

Lastly, regarding the prismatic elements 22, the radius of curvature at the apex 224 is satisfactorily small (namely, the apex 224 almost has an acute angle), such that images generated by a head-mounted display employing the optical lens device are not liable to deform.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An optical lens device for a head-mounted display, comprising:
    a transparent support substrate; and
    a Fresnel lens disposed on said support substrate, and including a central lens element and a plurality of prismatic elements arranged relative to said central lens element in a proximal-to-distal manner, each of said prismatic elements having a base that faces toward said support substrate, and a draft facet and a sloped facet that extend from said base away from said support substrate to intersect with each other to form an apex, each of said prismatic elements having a height that is measured from said base to said apex and that is not greater than 75 μm, said base having a width that is not greater than 250 μm,
    wherein each of said prismatic elements has a radius of curvature at said apex that is not greater than 2 μm;
    wherein said draft facet of one of said prismatic elements intersects with said sloped facet of an adjacent one of said prismatic elements to form a groove nadir, a radius of curvature at said groove nadir being not greater than 2 μm; and
    wherein said Fresnel lens is made from ultraviolet (UV)-curable resin.

2. The optical lens device as claimed in claim 1, wherein said width of said base of each of said prismatic elements ranges from 30 to 200 μm.

3. The optical lens device as claimed in claim 1, wherein said height of each of said prismatic elements ranges from 2 to 25 μm.

4. The optical lens device as claimed in claim 1, wherein said Fresnel lens is made from methacrylate-based ultraviolet (UV)-curable resin.

5. The optical lens device as claimed in claim 1, wherein said support substrate is made from a material selected from the group consisting of polyethylene terephthalate, polycarbonate, poly(methyl methacrylate), and combinations thereof.

6. The optical lens device as claimed in claim 1, wherein said support substrate has a thickness that is not greater than 600 μm.

7. The optical lens device as claimed in claim 1, wherein said support substrate has a radius of curvature that ranges from 0.5 cm to 15 cm.

8. The optical lens device as claimed in claim 1, wherein said prismatic elements are arranged concentrically.

9. The optical lens device as claimed in claim 1, wherein said prismatic elements are arranged parallel to one another.

10. The optical lens device as claimed in claim 1, further comprising a protective film disposed on at least one of said Fresnel lens and said transport substrate.

11. The optical lens device as claimed in claim 1, wherein said central lens element is one of a protruding lens element, a recessed lens element, and a flat lens element.

* * * * *